July 14, 1970    R. WARD    3,520,619
APPARATUS FOR THE DETERMINATION AND/OR CONTROL OF THE
PROPORTIONS OF THE CONSTITUENTS IN
A FLUID MIXTURE OR EMULSION
Filed Jan. 23, 1967    4 Sheets-Sheet 1
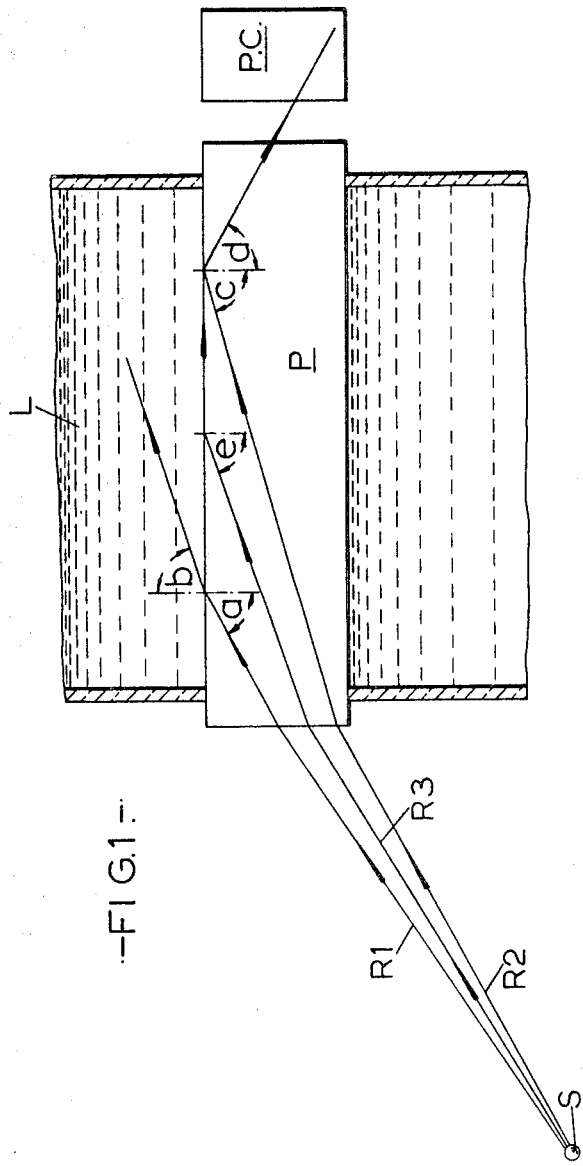
INVENTOR:
RICHARD WARD July 14, 1970  R. WARD  3,520,619
APPARATUS FOR THE DETERMINATION AND/OR CONTROL OF THE
PROPORTIONS OF THE CONSTITUENTS IN
A FLUID MIXTURE OR EMULSION
Filed Jan. 23, 1967  4 Sheets-Sheet 2
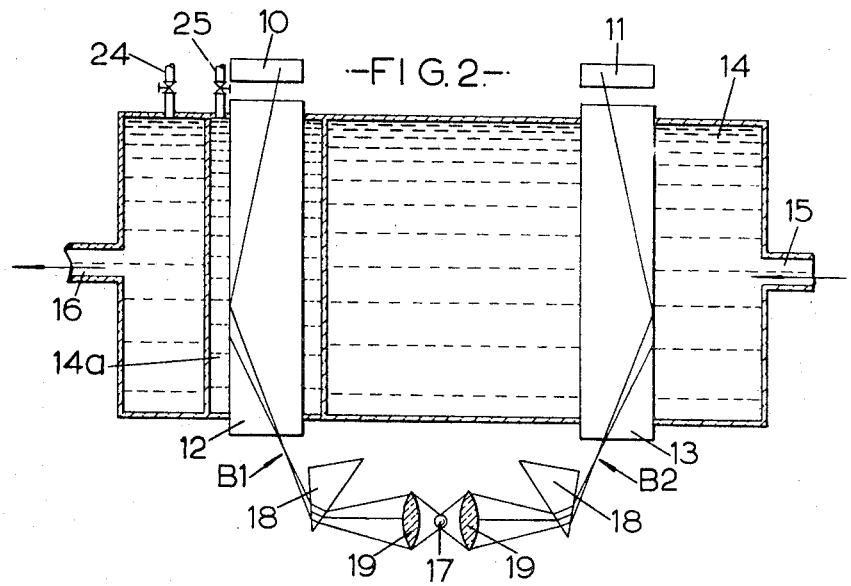
INVENTOR:
RICHARD WARD
BY
ATTYS.

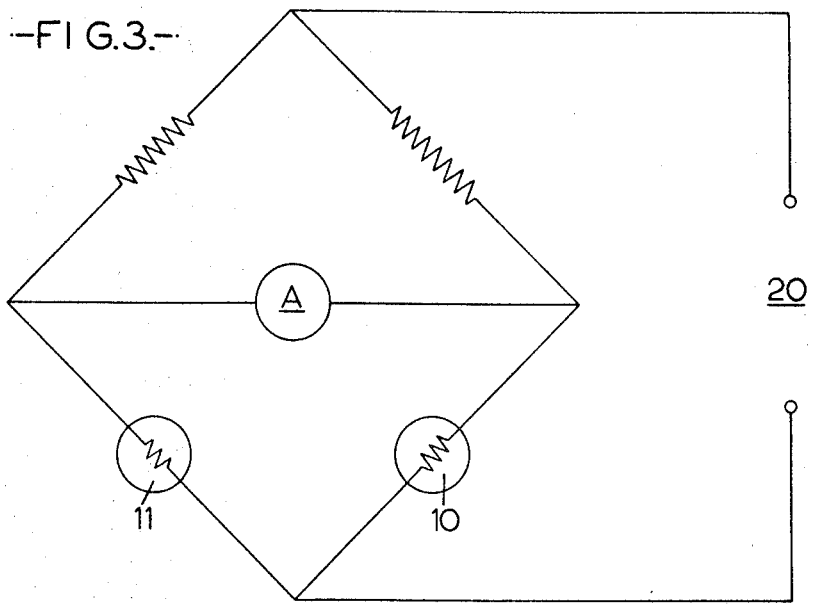
-FIG.3.-
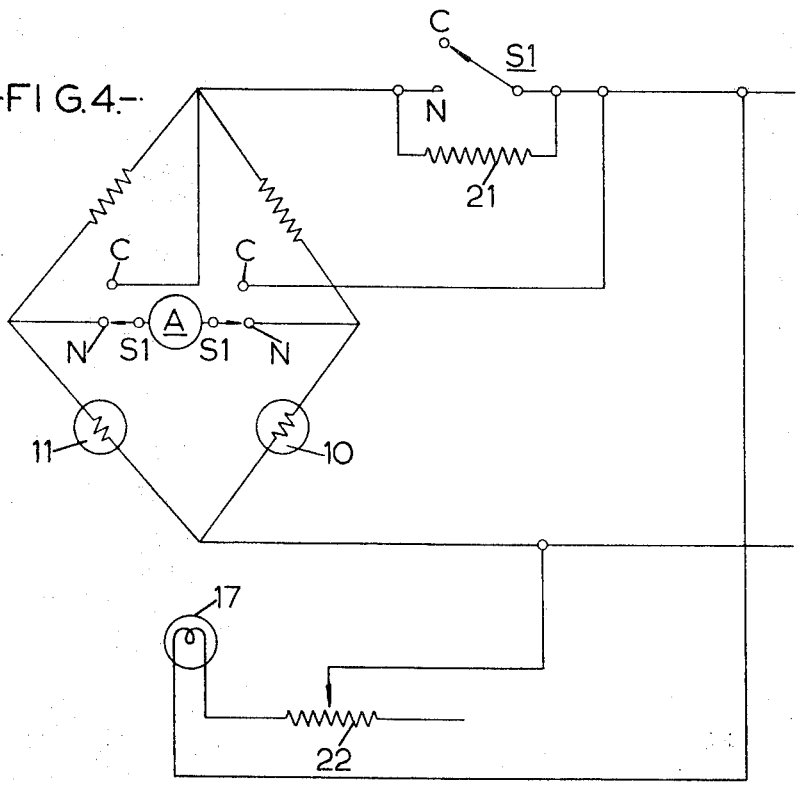
-FIG.4.-
INVENTOR:
RICHARD WARD

# United States Patent Office 3,520,619
Patented July 14, 1970

3,520,619
APPARATUS FOR THE DETERMINATION AND/OR CONTROL OF THE PROPORTIONS OF THE CONSTITUENTS IN A FLUID MIXTURE OR EMULSION
Richard Ward, Worsley, England, assignor to Gullick Limited, Wigan, Lancashire, England, a British company
Filed Jan. 23, 1967, Ser. No. 611,085
Claims priority, application Great Britain, Feb. 12, 1966, 6,286/66
Int. Cl. G01n *21/46*
U.S. Cl. 356—130      6 Claims

ABSTRACT OF THE DISCLOSURE

An apparatus for the determination or sensing of the proportions of the constituents in a fluid mixture, solution or emulsion (hereinafter referred to as the main fluid) comprises two refractometers one of which is responsive to a reference fluid and the other to the main fluid. Each refractometer includes a photo-cell so that the output from each refractometer is in the form of an electrical signal. The photo-cells are connected in an electrical system so that any unbalance or deviation between said signals will cause a change in current flow or potential in said system. This change in current flow or potential may be used to indicate a variation in the proportions of the constituents of the main fluid and/or adjust said proportions.

---

As indicated, the apparatus may be used simply to indicate, by means of, for example, a microammeter instrument appropriately calibrated, any variations in, for example, the amount of oil in an oil/water emulsion or alternatively, or additionally, the apparatus may be connected in a closed loop system to control the admission of oil to the emulsion and thereby maintain the oil/water proportions substantially constant.

This invention is for improvements in or relating to apparatus for the determination and/or control of the proportioins of the constituents in a fluid mixture emulsion or solution.

The invention is particularly, although not exclusively concerned with an apparatus for the determination and/or control of the oil content in the oil/water emulsions used in the operation of hydraulic apparatus. A particular example of such hydraulic apparatus is the powered or self-advancing mine roof support.

The invention has, however, a wide field of application in, for instance, processes which depend on solutions, emulsions or mixtures being kept to prescribed proportions. Examples of such processes are to be found in brewing and the manufacture of sugar syrups.

In hydraulic systems using oil/water emulsions a serious problem is that of keeping the percentage of oil in the water within prescribed limits. If too little oil is used corrosion takes place in the system and the lubrication properties of the emulsion also deteriorate. On the other hand, if too much oil is used the emulsion is unnecessarily expensive and if extremely high concentrations are used the emulsion can clog the valves and even become inflammable.

Heretofore the most practical method for on-the-spot determination of oil content in an oil/water emulsion involves the use of a portable refractometer, the change in the refractive index of the emulsion being an indication of its oil content. If this method is to be used effectively samples of emulsion must be inspected at frequent intervals by a person with sufficient skill to interpret the readings and sufficiently aware of the importance of the matter to ensure that testing is, in fact, done regularly.

These requirements are unlikely to be met in many industries and particularly in the mining industry and an object of the present invention is, therefore, to provide an apparatus which can be fitted permanently in a hydraulic system or the like and which will give a continuous indication of, for example, the oil content in an oil and water emulsion.

A further object of the invention is to provide an apparatus for the above-mentioned purpose which is relatively inexpensive as compared with apparatus, for similar purposes heretofore available, is of robust construction, is intrinsically safe or flame-proof and the accuracy of which is not materially impaired by changes in ambient or fluid temperature.

The invention will be further described, by way of example, with reference to the accompanying diagrammatic drawings in which:

FIG. 1 illustrates the basic theory on which the invention has evolved,

FIG. 2 shows a practical embodiment of the invention,

FIG. 3 shows one arrangement of the indicator circuitry for use with the apparatus shown in FIG. 2, and FIGS. 4 and 5 show modifications of the apparatus shown in FIGS. 2 and 3.

Figure 5:
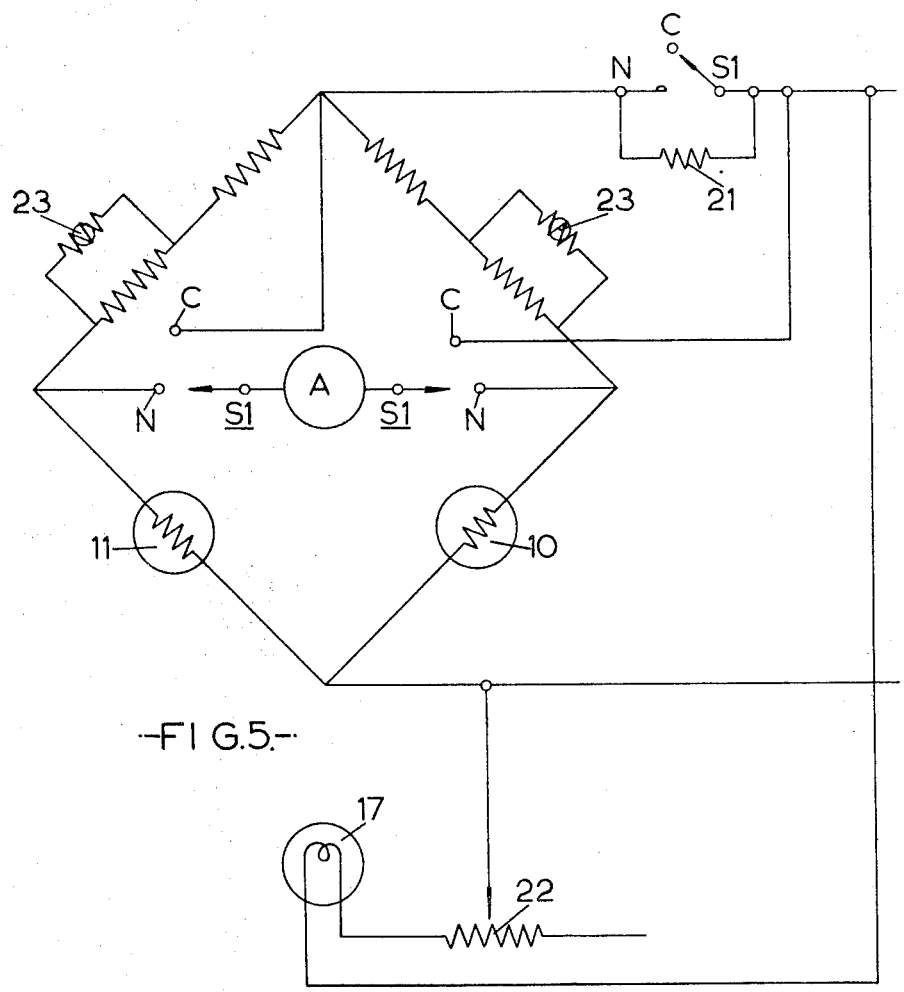

Referring first to FIG. 1, P indicates a quadrangular prism immersed, except for its ends, in a liquid L. A diverging beam of light, from a light source S, is projected into the prism P at an angle so that it intersects an interface between the glass and the liquid. As is well known, when light passes from a medium of high refractive index, e.g. glass, to one of lower refractive index, e.g. water or a water/oil emulsion, it is bent towards the medium of higher refractive index. In the arrangement shown in FIG. 1 this means that the ray R1 at one edge of the beam strikes the interface at an angle $a$ and emerges into the liquid at a smaller angle $b$ which depends on the two refractive indices. A ray such as R2 at the other edge of the beam will strike the interface at such an angle that the ray is totally internally reflected, angle $c$ being equal to angle $d$. In other words, the interface acts as a mirror. Between the rays R1 and R2 there is a ray R3 which strikes the interface at the critical angle $e$ so that the beam emerges parallel to the interface.

All rays between R1 and R3 will pass into the liquid L and be "lost." All rays between R3 and R2 will be totally internally reflected and will emerge from the end of the prism P remote from the light source S. If the apparatus is set up so that R3 is in the centre of the diverging beam when the liquid has a certain refractive index, half the light will be lost and half will emerge at the end of the prism. Any change in the refractive index of the liquid will cause increase or decrease in the proportion of the light emerging according to whether the refractive index falls or rises.

If a photo-cell PC is positioned as shown in front of the emregent end of the prism the amount of light acting upon it will vary with the refractive index of the liquid. By connecting the photo-cell in a suitable circuit the current flow in the cell can be used to operate an indicating instrument to give an indication of the refractive index of the liquid.

A simple system as above described is not without modification, suitable for the purpose of the present invention because of inaccuracies resulting, for example, from a small change in the intensity of the light source, due to voltage variations, or variations in the temperature of the liquid.

In the embodiment of the invention shown in FIG. 2 inaccuracies or errors due to the just-mentioned causes are avoided, at least to a material degree, as are also errors due to secondary causes such as the temperature coefficient of the photo-cell.

In the embodiment of the invention shown in FIG. 2 two separate photo-cells 10 and 11 receive respectively light transmitted through glass prisms 12 and 13.

The prism 12 is surrounded by a fluid of known refractive index and with the same temperature coefficient as the main fluid, i.e. the fluid, the refractive index of which is to be measured and thereby the proportions of its constituents continuously indicated and/or controlled. Conveniently, the reference fluid is a sample of the main fluid of the correct proportions unless the main fluid is an unstable mixture in which case an appropriate substitute should be used.

The reference fluid is housed in a chamber 14a surrounding the prism 12 and immersed in the main fluid. The prism 13 is immersed in the main fluid which passes through a chamber 14 having an inlet 15 and an outlet 16.

The chambers 14 and 14a may be bored or otherwise formed in a relatively massive and robust metal body or casting so that the apparatus is not readily affected by temperature changes and can withstand the rough usage to which it will be subjected on, for example, a coal mine.

A single light source 17 is formed into two identical diverging beams by two identical optical systems of prisms and lenses 18 and 19. The arrangement is such that the beam B1 enters the prism 12 at the same angle as the beam B2 enters the prism 13.

The prisms 18 may be integral with or be cemented onto the ends of the respective prisms 12 and 13.

The two photo-cells, 10 and 11, may be, for example, of the photo-conductive type and may be connected in a resistance bridge circuit as shown in FIG. 3. Alternatively, for example, the photo-cells may be of the photo-voltaic type connected to a differential amplifier.

The bridge circuit shown in FIG. 3 includes a stabilised voltage source 20 and a microammeter A calibrated to give directly the refractive index of the main fluid or the relative proportion of one of the constituents of the main fluid, e.g. the amount of oil in an oil/water emulsion.

As the photo-cells are identical and the bridge in the bridge circuit is arranged to be symmetrical and balanced when the reference and main fluids are identical, any change in light sensed by both photocells equally will not change the bridge balance and hence the microammeter reading will not change.

Any change in lamp voltage will be sensed by both photo-cells and will be balanced out. Similarly, any change in temperature will affect both the main and the reference fluids as one is immersed in the other and will be balanced out. Hence, inaccuracies due to changes in lamp voltage or temperature will not materally affect the reading of the microammeter A.

Any change in the refractive index of the main fluid, however, will only cause a change in the photocell 11 and the resultant out-of-balance current will be measured by he microammeter which may, as indicated above, be calibrated in terms of percentage oil, refractive index or whatever quantity is being determined or measured.

Although, as indicated above, at the balance point all errors are cancelled out, scale errors at either side of the balance point can occur with, for example, changes in lamp brightness. If the lamp is supplied with current from a stabilised supply, such errors are small but lamp ageing will cause a gradual drift in accuracy and the fitting of a new lamp could cause large errors. Where extreme accuracy is required, therefore, the circuit shown in FIG. 3 is mdified as shown in FIG. 4 to provide setting up and checking facilities.

Referring to FIG. 4, switch S1 is a 3-pole switch having two positions C and N and which is used to switch the microammeter A out of the bridge circuit and connect it across a shunt 21.

The lampholder for the light source 17 is constructed so that it can be adjusted in position to compensate for differences in filament position encountered when changing an old lamp for a new lamp. A rheostat 22 is included in the lamp and shunt circuit.

The microammeter A has a calibration mark at a current corresponding to the correct total bridge current when applied across the shunt 21.

The system may be set up as follows:

With the switch in the "normal" position N and with reference fluid in the main tank and in the reference fluid compartment, the lampholder is adjusted until the bridge is balanced. The switch is then switched to the position C and the rheostat 22 adjusted until the microammeter A indicates that the current flow is equivalent to the total bridge current, i.e. the light intensity is the same as that at which the meter was calibrated. The instrument will now read correctly and lamp ageing can be checked at any time by switching to "check" (C position of the switch) and observing the bridge current, readjustments being made if necessary.

After setting up, the reference fluid is, of course, run out of the main tank and the tank connected in the main fluid flow circuit unless for the test the fluid in the tank has been accurately adjusted to the required proportion.

In the apparatus above described a temporary error in reading could be caused by a rapid change in the temperature of the main fluid due to the time taken for the reference fluid to follow the temperature change. This error can be minimised by immersing a temperature sensitive resistor 23 (e.g. a thermistor) in the main fluid and another in the reference fluid. The thermistors are connected into the bridge circuit as shown in FIG. 5 so that a change in resistance tends to cancel unbalance in the bridge due to differences in temperature between the main and reference fluids. Thermistors and shunt resistors will be selected so as to match as nearly as possible the characteristics of the fluids being measured.

For the testing of samples of fluids, as distinct from monitoring a fluid flow, the apparatus shown in FIG. 2 may be provided with inlet and discharge means 24 and 25 for the main and reference fluids respectively.

The power levels required for the operation of the apparatus may be such that there is no risk of the apparatus causing fires in conditions to be met with in, for example, coal mines. For such conditions the light source should be a lamp housed in such a way that it cannot be exposed without being disconnected.

I claim:

1. An apparatus for sensing the proportions of the constituents of a fluid mixture (hereinafter referred to as the main fluid) comprising a refractometer, a receptacle for a reference fluid and having said refractometer mounted therein, a second refractometer and a second receptacle for the fluid mixture and having said second refractometer mounted therein, each refractometer including a photocell so that the output from each refractometer is in the form of an electrical signal, and an electrical system for comparing, and yielding an output in response to a deviation between said signal, the improvements residing in that the reference fluid receptacle is enclosed within said second receptacle whereby the main fluid establishes the temperature of the reference fluid.

2. Apparatus as claimed in claim 1 wherein a flow pipe is provided for the main fluid whereby the apparatus may be used continuously to sense the proportions of the constituents of a flow of the main fluid.

3. Apparatus as claimed in claim 1 wherein a common light source is provided for the two refractometers and optical means is provided for directing light beams from said common light source to the two refractometers respectively.

4. An apparatus as claimed in claim 1 wherein a light source for the refractometers is adjustable in intensity to balance a bridge circuit of the electrical system.

5. An apparatus as claimed in claim 1 wherein the electrical system includes a shunt resistance, switch means for substituting said shunt resistance for a resistance bridge circuit of the electrical system, a microammeter having a calibration mark to indicate a current flow through said shunt resistance equal to the total resistance bridge current flow and a rheostat for adjusting the current flow through a light source, of the refractometers, and the shunt resistance to bring it equal to the total resistance bridge current whereby the apparatus can be checked and adjusted periodically to compensate for light source deterioration.

6. An apparatus as claimed in claim 1 wherein a temperature sensitive resistor is positioned in a receptacle for the main fluid and in a receptacle for the reference fluid, said resistors being connected in the electrical system so that a change in resistance tends to cancel unbalance in a bridge circuit of the electrical system due to differences in temperature between the main and reference fluids.

References Cited

UNITED STATES PATENTS

| | | | |
|---|---|---|---|
| 2,569,127 | 9/1951 | Eltenton | 137—93 X |
| 3,282,149 | 11/1966 | Shaw et al. | 356—130 |

RONALD L. WIBERT, Primary Examiner

T. MAJOR, Assistant Examiner

U.S. Cl. X.R.

356—133